(12) United States Patent
Guillemin et al.

(10) Patent No.: US 9,501,277 B2
(45) Date of Patent: Nov. 22, 2016

(54) SECURED COMPARISON METHOD OF TWO OPERANDS AND CORRESPONDING DEVICE

(71) Applicant: STMicroelectronics (Rousset) SA, Rousset (FR)

(72) Inventors: Pierre Guillemin, Marseilles (FR); Yannick Teglia, Belcodene (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 236 days.

(21) Appl. No.: 14/303,284

(22) Filed: Jun. 12, 2014

(65) Prior Publication Data
US 2014/0379770 A1     Dec. 25, 2014

(30) Foreign Application Priority Data

Jun. 24, 2013 (FR) ...................... 13 55992

(51) Int. Cl.
  *G06F 9/30* (2006.01)
  *G06F 7/02* (2006.01)
(52) U.S. Cl.
  CPC .......... *G06F 9/30021* (2013.01); *G06F 7/026* (2013.01); *G06F 2207/7271* (2013.01)
(58) Field of Classification Search
  None
  See application file for complete search history.

(56) References Cited

U.S. PATENT DOCUMENTS

| | | | |
|---|---|---|---|
| 4,225,849 A | 9/1980 | Lai | |
| 5,931,943 A * | 8/1999 | Orup | G06F 7/026 712/222 |
| 6,772,187 B1 | 8/2004 | Ott et al. | |
| 7,242,414 B1 * | 7/2007 | Thekkath | G06F 9/30014 345/623 |
| 2003/0126173 A1 * | 7/2003 | Steele, Jr. | G06F 7/026 708/495 |
| 2005/0210093 A1 | 9/2005 | Hinds et al. | |
| 2014/0379770 A1 * | 12/2014 | Guillemin | G06F 9/30021 708/236 |

OTHER PUBLICATIONS

French Search Report received in Application No. 1355992 mailed Apr. 7, 2014, 6 pages.

* cited by examiner

*Primary Examiner* — Michael D Yaary
(74) *Attorney, Agent, or Firm* — Slater Matsil, LLP

(57) ABSTRACT

A first operation of comparison of the first initial operand with the second initial operand uses at least one comparison operator in such a way as to obtain a first final result word. A second operation of comparison of the second initial operand with the first initial operand uses the at least one comparison operator in such a way as to obtain a second final result word. Another operation checks the values of the bits of the two final result words in relation to a part at least of r combinations of reference values taken from possible combinations of values of these two final result words. These reference combinations represent a valid result of comparison of the two operands including an equality, a relationship of inferiority and a relationship of superiority between the two operands.

26 Claims, 6 Drawing Sheets

SECURED COMPARISON METHOD OF TWO OPERANDS AND CORRESPONDING DEVICE

This application claims the benefit of French Application No. 1355992, filed on Jun. 24, 2013, which application is hereby incorporated herein by reference.

TECHNICAL FIELD

The invention relates to the comparison of two operands, notably but not exclusively, the comparison of two sensitive operands such as those capable of being used in encryption/decryption algorithms implemented, for example, in secure devices such as integrated circuit cards such as smart cards.

BACKGROUND

Smart cards can be, for example, plastic cards having an embedded integrated circuit (IC). That IC may be a logic circuit with its associated memories or a microcontroller with its associated memories and software, or a microcontroller with its associated memories and software coupled to a custom circuit block or interface.

Comparison methods are used to calculate a difference between the two operands to be compared and to supply "0" or "1" binary information representing an equality or inequality between the two operands.

However, a need exists in some cryptographic applications to be able to carry out a secure comparison of two operands that can indicate whether the two operands are equal or whether one is greater or less than the other.

SUMMARY

According to one embodiment, a method is proposed provide a comparison indication including a relationship of equality, relative inferiority or relative superiority of the two operands.

One embodiment provides a method of secure comparison of two initial operands each having b bits. A first operation of comparison of the first initial operand with the second initial operand uses at least one comparison operator in such a way as to obtain a first final result word having p bits. This variable p is less than b. A second operation of comparison of the second initial operand with the first initial operand uses the at least one comparison operator in such a way as to obtain a second final result word having p bits. An operation of checking the values of the bits of the two final result words in relation to a part at least of r combinations of reference values (CMBR) taken from the $2^{2p}$ possible combinations of values of these two final result words. These r reference combinations (r being less than $2^{2p}$) represent a valid result of comparison of the two operands including an equality, a relationship of inferiority and a relationship of superiority between the two operands.

BRIEF DESCRIPTION OF THE DRAWINGS

Other advantages and characteristics of the invention will become evident from the detailed description of embodiments, which are in no way limiting, and the attached drawings, in which.

DETAILED DESCRIPTION OF ILLUSTRATIVE EMBODIMENTS

Figure 1:
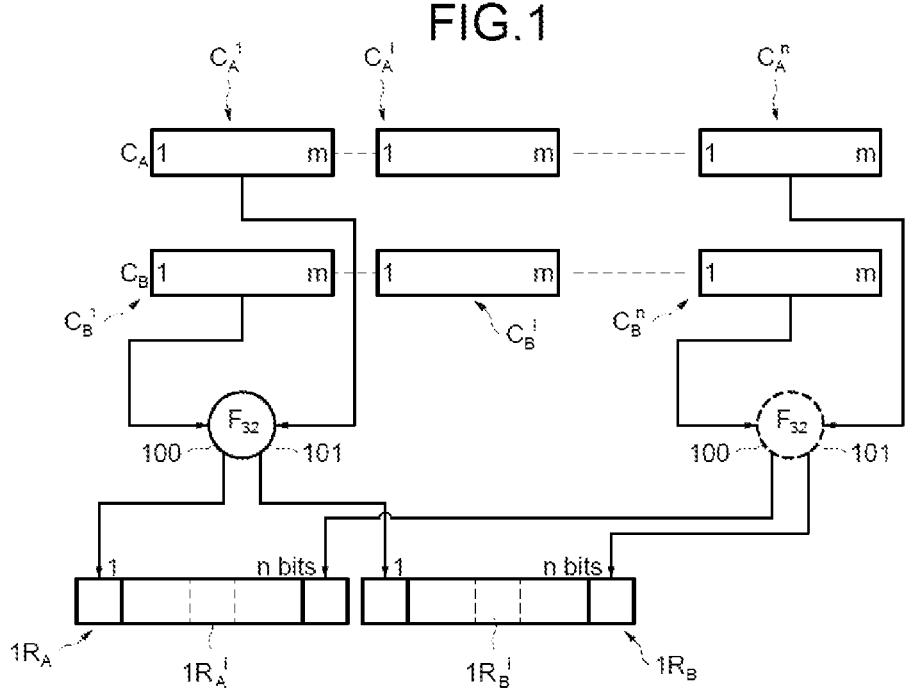
FIGS. 1 to 11 schematically illustrate embodiments of the method according to the invention, and FIG. 12 schematically illustrates an embodiment of a device incorporating an integrated circuit according to the invention.

Attacks that can be perpetrated by an attacker wishing to discover sensitive data implemented in a cryptographic algorithm may include attacks by fault injection, which consists in attempting to modify, for example by using a laser beam, bits contained, for example, in a register, and in observing the consequences for the performance of the cryptographic method and/or intermediate and/or output data in such a way as to attempt to obtain information on sensitive data, for example keys.

According to one embodiment, a method is proposed for the comparison of two operands which offers strong resilience to attacks by fault injection.

According to one embodiment, a method is also proposed for comparing two operands. The method is carried out in a temporally uniform manner, i.e., operating constantly over time with similar steps regardless of the result of the comparison, regardless of the values of the operands and whether the comparison is valid or is considered as invalid.

According to one aspect, a secure method is proposed for comparing two initial operands each having b bits. The variable b is generally very high, for example, on the order of several hundreds or several thousands.

The method according to this aspect includes a first operation of comparison of the first initial operand in relation to the second initial operand using at least one comparison operator, for example a difference operator, in such a way as to obtain a first final result word having p bits, p being less than b. For example, p may be equal to 4.

The method also includes a second operation of comparison of the second initial operand in relation to the first initial operand using the at least one comparison operator, in such a way as to obtain a second final result word having p bits.

Thus, by way of example, the first comparison operation can calculate a difference A-B, where A and B denote the two initial operands, while the second comparison operation calculates the difference B-A.

Thus, ultimately, out of the $2^{2p}$ combinations of possible values defined by the 2p bits of the two final result words $2R_A$ and $2R_B$, only r combinations, where r is less than $2^{2p}$, represent a valid comparison.

Thus, the two comparison operations not only determine whether the two operands are equal or if one of the operands is less than the other or greater than the other, they also create an information redundancy which results in combinations of reference values representing a valid comparison and the result per se, and comparisons representing an invalid comparison.

And the number r is generally greater than three.

The method according to this aspect also includes an operation of checking the values of the bits of the two final result words in relation to a part at least of these r combinations of reference values.

This information redundancy resulting in the provision of combinations of valid values and other invalid values will contribute to the resilience of the method to attacks by fault injection.

The comparison operator(s) used may be any operator which calculates a relative comparison between two operands. By way of a non-limiting example, a difference, a division, or a modular reduction can notably be calculated.

Although it is possible to compare the values of the bits of the two final result words in relation to all of the r reference combinations, regardless of the comparison operator used, the r combinations of reference values actually include sub-combinations of reference values involving at least some of the 2p bits. These bits are in fact "significant" bits, the other bits of the combinations of reference values being able to assume any other value.

Also, the checking operation then advantageously comprises a check on the presence or absence of one of these sub-combinations of reference values in the values of the bits of the two final result words.

This being so, it is particularly advantageous, notably for the simplicity of carrying out the method, notably within an integrated circuit card such as a smartcard, and in order to avoid having to carry out an actual test bit-by-bit, for example between the values of the bits of the final result words and the sub-combinations of reference values, to produce reference addresses of a storage device, for example a memory, on the basis of these sub-combinations of reference values.

Thus, according to one embodiment, each reference address comprises, when a sub-combination of reference values involves only q bits (significant bits), q being less than 2p, the q bits of the sub-combination of reference values supplemented by 2p-q reference bits each having the same reference value, for example the value 0 (since the value of these non-significant 2p-q bits is irrelevant). When the latter involves 2p bits, each reference address comprises the sub-combination of reference values.

An indication representing the validity of the comparison and the result of the comparison is then advantageously stored in the memory device at each of the reference addresses.

Also, according to one embodiment, the checking operation similarly includes a transformation of the two final result words into address information. Also, in a manner similar to the formation of the reference addresses, this address information is the sub-combination of reference values supplemented by 2p-q other bits having the reference value (e.g., 0) when the final result words contain a sub-combination of reference values involving only q bits. This address information is the sub-combination of reference values when the 2p bits of the final result words form this sub-combination of reference values.

An addressing of the memory device with the address information is then carried out.

Also, when this address information actually corresponds to a reference address, the indication representing, on the one hand, the validity of the comparison, and, on the other hand, the result of the comparison (equality, inferiority or superiority) is received in return.

Although it is possible to detect an invalid comparison in the presence of combinations of invalid bits, (for example 01-01 combinations), it is particularly advantageous, notably for the temporal uniformity character of carrying out the method, to use the corresponding address information. Also, when the address information does not correspond to a reference address, an indication representing an invalidity of the comparison is then output.

In practice, notably when the numbers of bits of the initial operands are high, each comparison operation, according to one embodiment, uses a sequence of a plurality of comparison operators, a current comparison operator of the sequence operating on two current operands in such a way as to obtain two current result words of reduced size compared with the size of the current operands, the first comparison operator of the sequence operating on the two initial operands, the last comparison operator of the sequence supplying the final result words, and the two current operands being the preceding two result words.

Also, according to one embodiment, each comparison operator operates on pairs of homologous words of their two corresponding operands and encodes the result of the first relative comparison of a pair of words on one bit forming one bit of one of the two corresponding result words, and encodes the result of the second relative comparison of the pair of words on one bit forming one bit of the other of the two corresponding result words.

This is notably the case when each comparison operator is the carry value of a difference operator, the carry value of the difference of a pair of words being encoded on one bit.

A reference address may advantageously include two reference address words and the following configurations are then possible, regardless of the type of comparison operator used:

the bits of the two reference address words are all equal, for example equal to 0, one of the reference address words contains only one single significant bit equal to 1, followed by bits all having the reference value, for example 0, while the other reference address word contains only one single significant bit equal to 0, followed by bits all having the reference value, for example 0, one of the reference address words contains only one single significant bit equal to 1, preceded by bits all having the reference value, while the other reference address word contains only one single significant bit equal to 0, preceded by bits all having the reference value, one of the reference address words contains only one single significant bit equal to 1, preceded by one or more significant bits equal to 0 and followed by bits all having the reference value, while the other reference address word contains significant bits equal to 0, followed by bits all having the reference value.

However, regardless of the configurations, the significant bits are bits of the same order in the two reference address words.

According to one embodiment, the transformation of the two final result words into the address information can be particularly simple.

More precisely, it includes a detection in each of the final result words of the presence or absence of a bit equal to 1 and, in the presence of a bit equal to 1 in only one of the final result words, a replacement in this final result word of the bits following the bit equal to 1 with bits having the reference value and a replacement of the homologous bits of the other final result word with bits having the reference value, in such a way as to form two address words.

On the other hand, in the presence of equal bits in the two final result words, the final result words are not then modified, the latter then directly forming the two address words.

When the presence or absence of a bit equal to 1 (which corresponds in fact to an invalid comparison) is detected in each of the final result words, the two final result words are then also transformed into address information by replacing, in each final result word, the bits following the bit equal to 1 with bits having the reference value.

In this case, this therefore results in the provision of address information formed from two address words which will be routed to a location of the memory in which an indication representing an invalidity of the comparison is stored.

According to a different aspect, an integrated circuit is proposed containing a processing unit configured to carry out the method as defined above. A device, for example an integrated circuit card or a smartcard, may incorporate an integrated circuit of this type.

In FIG. 1, the reference $C_A$ denotes a first initial operand and the reference $C_B$ denotes a second initial operand.

Here, the first operand $C_A$ comprises n words $C_A^i$ with i varying from 1 to n, n being, for example, equal to 32.

Each word $C_A^i$ comprises m bits, for example 32 bits.

The structure of the operand $C_B$ is similar to the structure of the operand $C_A$, i.e. it comprises n words $C_B^i$, each comprising m bits.

Different embodiments of a method for carrying out a secure comparison between these two initial operands will now be described.

As shown in FIG. 1, a first elementary comparison operation 100 is carried out on each pair of homologous words $C_A^i$, $C_B^i$ using a comparison operator $F_{32}$ to compare $C_B$ with $C_A$.

A second elementary comparison operation 101 is also carried out on each pair of homologous words of the two operands, with the same comparison operator $F_{32}$, this time in such a way as to compare the operand $C_A$ with the operand $C_B$.

The elementary comparison operation 100 provides a first intermediate result word $1R_A$ here having n bits, while the second elementary operation 101 provides a second intermediate result word $1R_B$ also having n bits.

Figure 2:
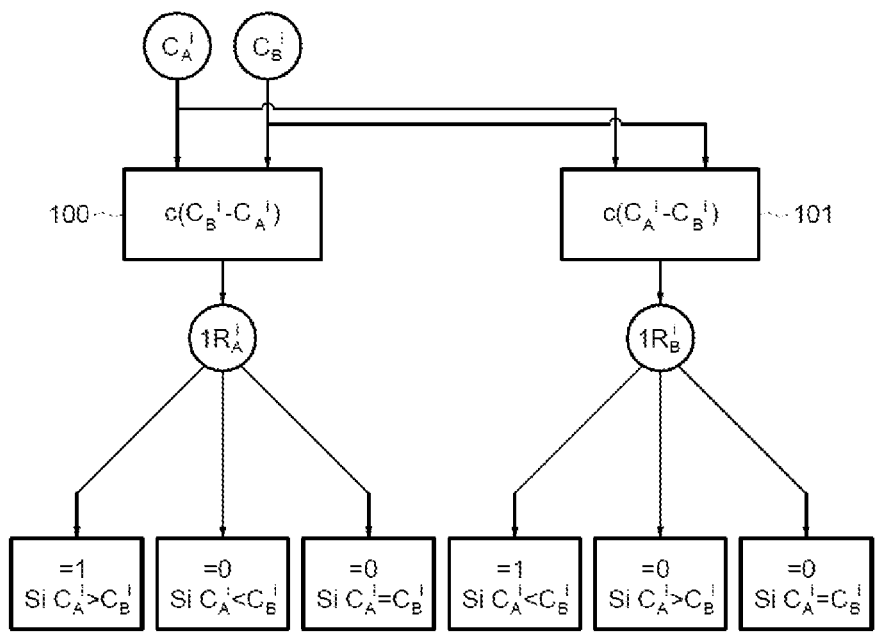

As shown in FIG. 2, the operator F32 is an operator which operates on the m (m=32) bits of each word of the two operands and which is in fact the carry value c of the difference between two homologous words of the two operands.

More precisely, for each pair of homologous words, the elementary comparison operation 100 calculates the carry value of the difference $C_B^i - C_A^i$, while the elementary comparison operation 101 calculates the carry value of the difference $C_A^i - C_B^i$.

This carry value, obtained by means of the elementary operation 100, forms the bit $1R_A^i$ of the intermediate word $1R_A$ and the carry value resulting from the elementary comparison operation 101 forms the bit $1R_B^i$ of the intermediate result word $1R_B$.

Furthermore, it is chosen here to encode the carry value on one bit which, as far as the bit $1R_A^i$ is concerned, is equal to 1 if $C_A^i$ is greater than $C_B^i$, and to 0 if $C_A^i$ is less than $C_B^i$ or if these two words are equal.

Furthermore, it is chosen here to encode the carry value on one bit which, as far as the bit $1R_A^i$ is concerned, is equal to 1 if $C_A^i$ is greater than $C_B^i$, and to 0 if $C_A^i$ is less than $C_B^i$ or if these two words are equal.

It is therefore evident that the intermediate result of the comparison of two homologous words of the two operands is encoded here on two bits and, out of the four possible combinations, only three are valid and representative of the comparison result, while the fourth, in this case the "11" combination, represents an invalid comparison.

Figure 3:
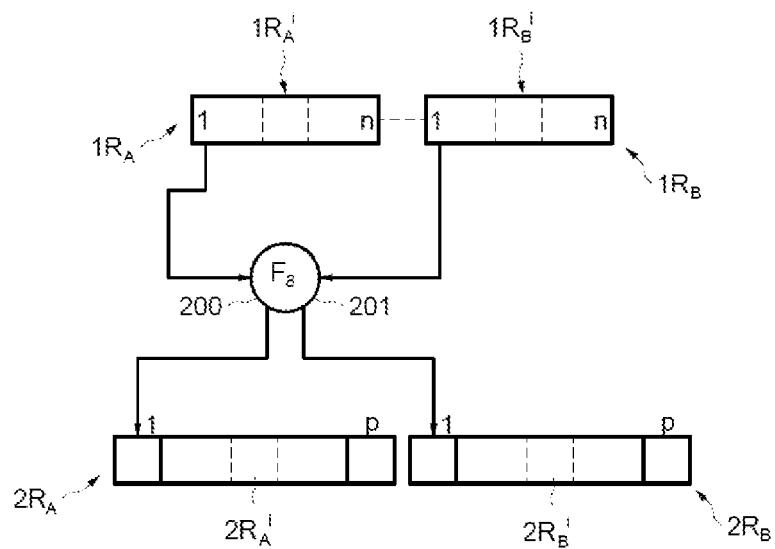

The two operations of relative comparison of the two initial operands continue (FIG. 3) by considering this time the two intermediate result words $1R_A$ and $1R_B$ as operands. This time, these two new operands each have n bits (here n=32).

Also, in a manner similar to that described with reference to FIG. 1 and to FIG. 2, each operand $1R_A$ and $1R_B$ can be broken down into a plurality of words, here four bytes.

Also, the same operator as that used in FIG. 1 is applied to the homologous bytes of two operands, but this time operating on eight bits, during two new elementary operations 200 and 201 in such a way as to obtain two new result words $2R_A$ and $2R_B$, each comprising p bits (here p=4).

Figure 4:
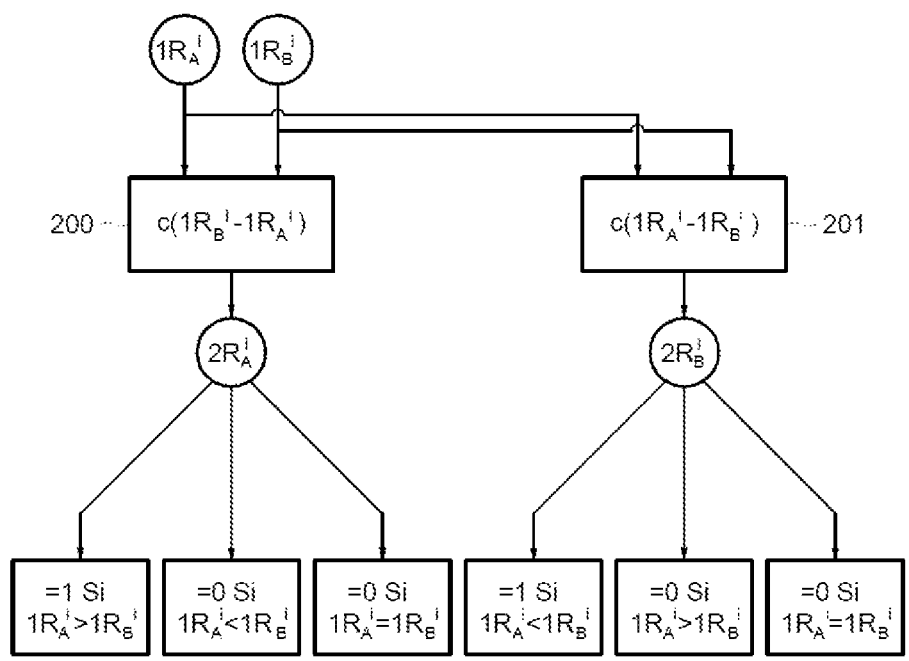
Figure 5:
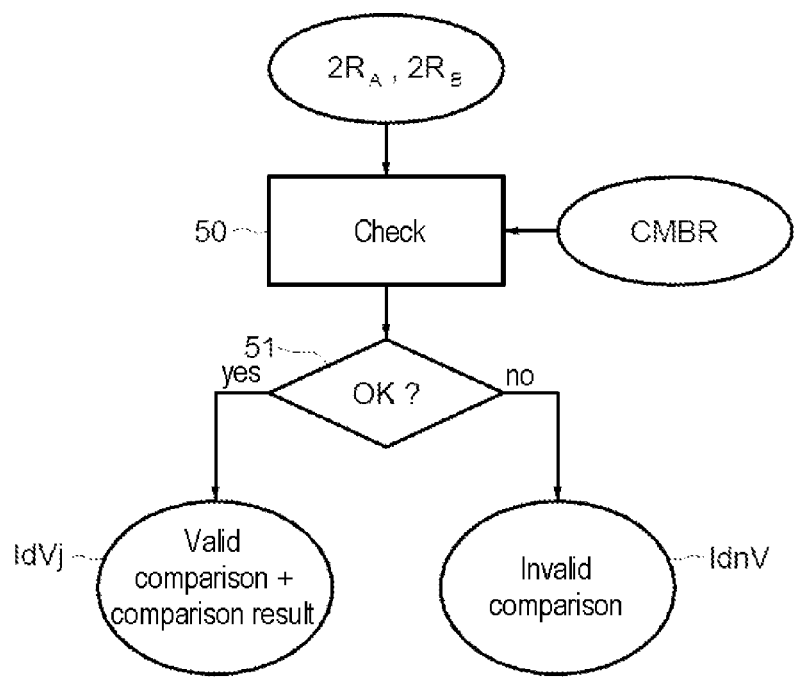
Figure 6:
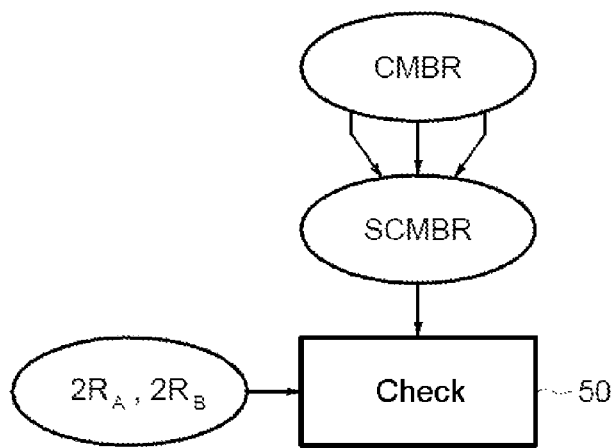

The encoding of the bits $2R_A^i$ of the result word $2R_A$ and the bits $2R_B^i$ of the result word $2R_B$ is shown in FIG. 4 and is similar to that described with reference to FIG. 2.

Notably according to the size of the initial operands, it can be envisaged to carry on with this dichotomy and continue to apply comparison operators to increasingly reduced operand sizes.

This being so, in the example described here, it is assumed that the two result words $2R_A$ and $2R_B$ are final result words, each including p bits (here p=4).

As seen above, some combinations of bits do not represent a valid comparison.

Thus, ultimately, out of the $2^{2p}$ combinations of possible values defined by the 2p bits of the two final result words $2R_A$ and $2R_B$, only r combinations, where r is less than $2^{2p}$, represent a valid comparison.

Thus, ultimately, out of the $2^{2p}$ combinations of possible values defined by the 2p bits of the two final result words $2R_A$ and $2R_B$, only r combinations, where r is less than $2^{2p}$, represent a valid comparison.

Also, in the case where one of these reference combinations occurs among these 2p bits of the two final result words, an indication IdVj is provided (step 51, "yes" branch) indicating, on the one hand, that the comparison is a valid comparison, and supplying, on the other hand, the result of the comparison.

If, on the other hand (step 51, "no" branch), none of the reference combinations occurs in the bits of the two final result words an indication IdnV is then provided indicating that the comparison is invalid.

This being so, regardless of the comparison operator used, the combinations of reference values CMBR have sub-combinations of values SCMBR which are common to some of these reference combinations. Some of these sub-combinations of reference values SCMBR thus involve only q bits, q being less than 2p.

Thus, ultimately, out of the $2^{2p}$ combinations of possible values defined by the 2p bits of the two final result words $2R_A$ and $2R_B$, only r combinations, where r is less than $2^{2p}$, represent a valid comparison.

Figure 7:
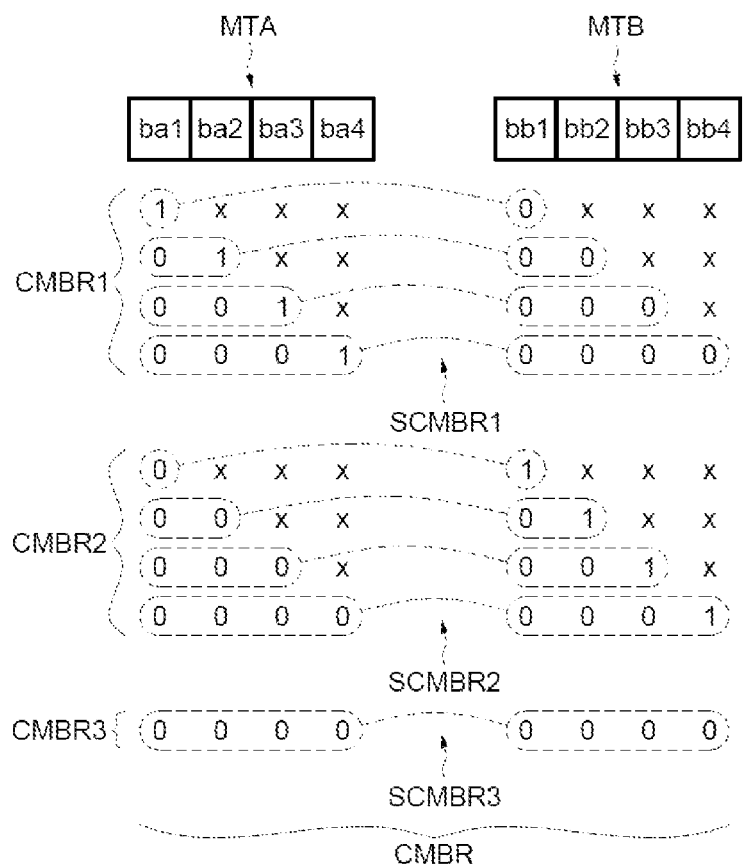

FIG. 7 shows an example of these sub-combinations of reference values for two words MTA and MTB, each having 4 bits, ba1-ba4 and bb1-bb4.

Thus, ultimately, out of the $2^{2p}$ combinations of possible values defined by the 2p bits of the two final result words $2R_A$ and $2R_B$, only r combinations, where r is less than $2^{2p}$, represent a valid comparison.

Consequently, it is evident that, out of the reference combinations CMBR1, the four sub-combinations of reference values SCMBR1 comprising the significant bits encircled by dashed lines can be identified, i.e.:

ba1=1 bb1=0
ba1=0 ba2=1 bb1=0 bb2=0
ba1=0 ba2=0 ba3=1 bb1=0 bb2=0 bb3=0
ba1=0 ba2=0 ba3=0 ba4=1 bb1=0 bb2=0 bb3=0 bb4=0.

Similarly, the reference combinations CMBR2 are those representing an initial operand CA less than the initial operand CB. Here also, out of these combinations of reference values CMBR2, four sub-combinations of reference values SCMBR2 comprising the significant bits encircled by dashed lines can be identified, i.e.:

ba1=0 bb1=1 ba1=0 ba2=0 bb1=0 bb2=1
ba1=0 ba2=0 ba3=0 bb1=0 bb2=0 bb3=1
ba1=0 ba2=0 ba3=0 ba4=0 bb1=0 bb2=0 bb3=0 bb4=1.

Finally, a single combination of reference values CMBR3 represents a valid comparison result signifying an equality between the two initial operands. This combination of reference values is the combination for which all the bits ba1-ba4, bb1-bb4 of the two words are equal, for example to 0, taking into account the coding used.

Also, obviously, in that case, the reference combination CMBR3 is identical to the reference sub-combination SCMBR3.

Figure 8:
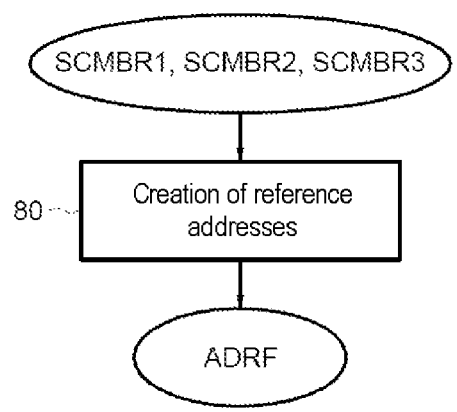

Instead of directly using the combinations of reference values or the sub-combinations of reference values to compare them bit-by-bit with the values of the final result words, it is particularly advantageous, as shown in FIG. 8, to create (step 80) reference addresses ADRF from the reference sub-combinations SCMBR1-SCMBR3.

Figure 9:
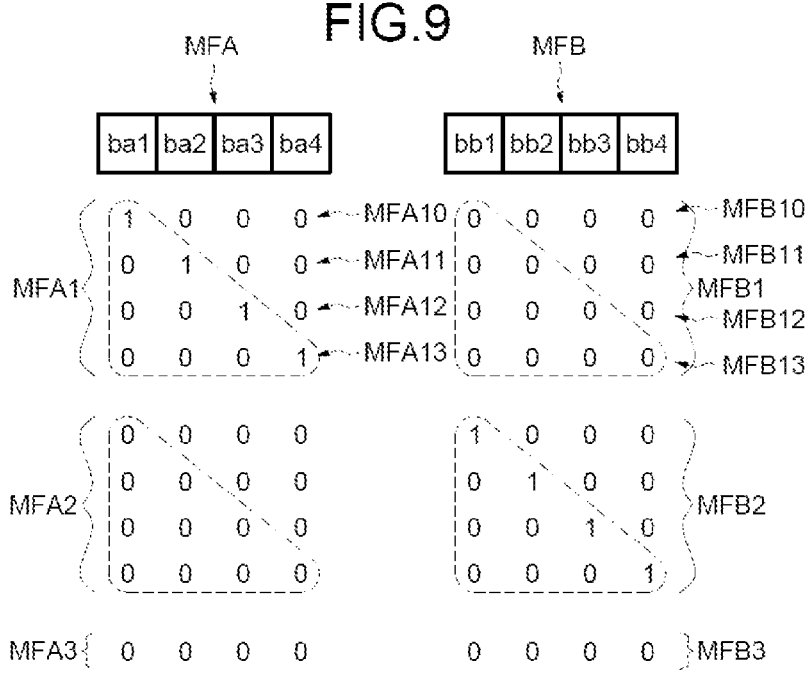

More precisely, each reference address here comprises two reference address words MFA and MFB (FIG. 9).

Also, in a general manner, when a sub-combination of reference values contains only q bits (q being less than 2p), the bits of the corresponding sub-combination of reference values are supplemented with bits all having the same reference value, in this case the value 0.

This is shown in FIG. 9 in which the areas encircled by dashed lines correspond to the sub-combinations of reference values.

A plurality of possible configurations for these reference addresses therefore results from this.

More precisely, either the bits of the two address words are all equal, here to 0, (reference address words MFA3 and MFB3) and this then corresponds to a reference address associated with an equality between the two initial operands.

Another possibility is that one of the reference address words (for example the reference address word MFA10) contains only one single significant bit equal to 1 followed by bits all having the reference value (in this case 0), while the other reference address word MFB10 contains only one single significant bit equal to 0 followed by bits all having the reference value.

It is also possible that one of the reference address words MFA13 contains only one single significant bit equal to 1 preceded by significant bit equal to 0 and that the other reference address word MFB13 contains only significant bits equal to 0.

Finally, it is also possible, as, for example, in the case of the reference address words MFA11 and MFB11, that one of the reference address words contains only one single significant bit equal to 1 preceded by one or more significant bits equal to 0 and followed by bits all having the reference value, while the other reference address word contains significant bits equal to 0 followed by bits all having the reference value.

However, in any case, the significant bits are bits of the same order in the reference address words.

Figure 10:
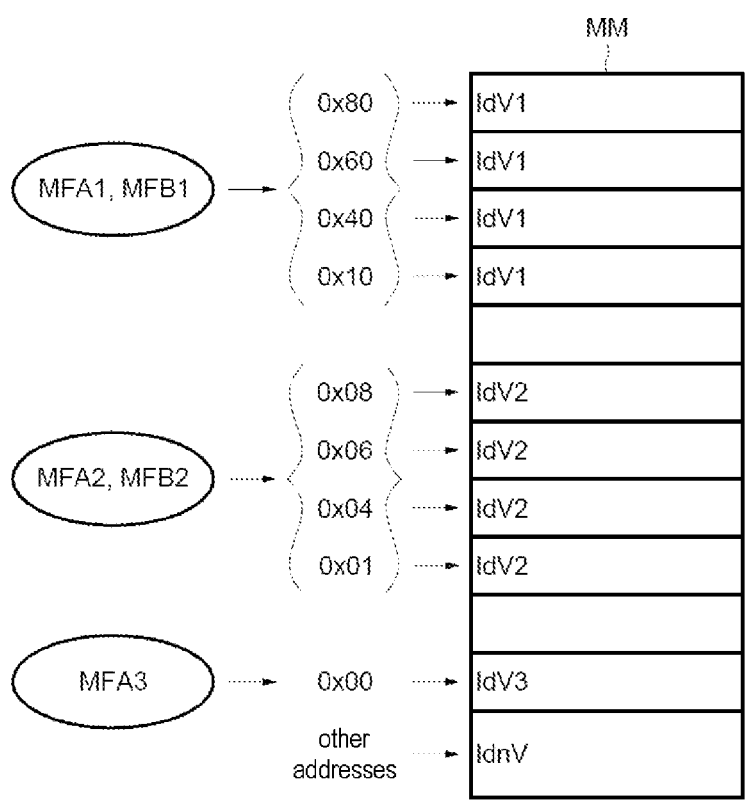
Figure 11:
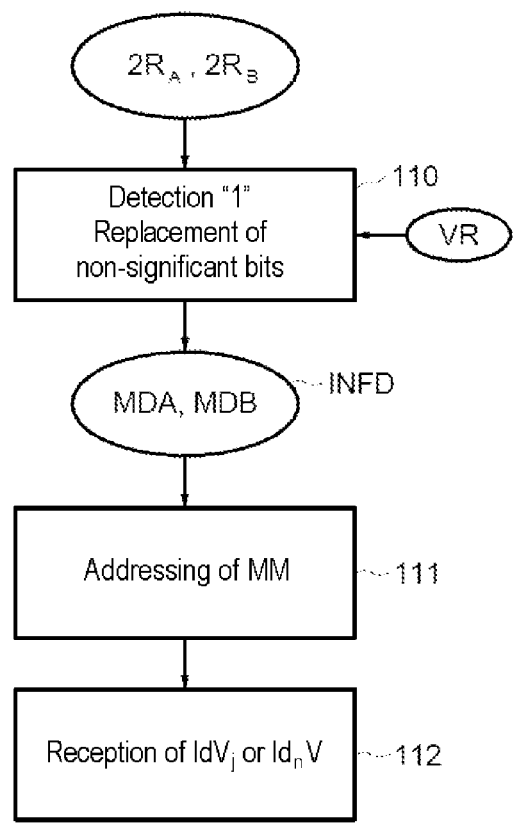

As shown in FIG. 10, the two reference address words define, for example in C language, an address enabling the addressing of a memory device MM containing a validity indication IdVj for each of the reference addresses.

More precisely, in this example, the reference address words MFA1 and MFB1 define the addresses 0x80, 0x40, 0x20 and 0x10 respectively.

The indication IdV1, signifying that the result of the comparison is valid and that the initial operand CA is greater than the initial operand CB, is stored at each of these addresses.

Similarly, the address words MFA2 and MFB2 define the following four addresses in C language: 0x08, 0x04, 0x02 et 0x01.

The indication IdV2 signifying that the result of the comparison is valid and that the initial operand CA is less than the initial operand CB is stored at each of these addresses in the memory MM.

Finally, the two reference address words MFA3 and MFB3 define the address 0x00.

The indication IdV3, signifying that the result of the comparison is valid and that there is equality between the two initial operands, is stored at this address in the memory MM.

Although it is possible to detect, even at bit level, an invalid combination or sub-combination of values, it is nevertheless preferable, for the purpose of standardising the method and making it less sensitive notably to timing attacks, to make provision, as shown in FIG. 10, for storing the indication IdnV representing an invalid comparison in the memory MM at all the other addresses.

Thus, ultimately, out of the $2^{2p}$ combinations of possible values defined by the 2p bits of the two final result words $2R_A$ and $2R_B$, only r combinations, where r is less than $2^{2p}$, represent a valid comparison.

Also, in the presence of a bit equal to 1 in only one of the final result words or in the two final result words, the bits following the bit equal to 1 are replaced in this final result word or in the two final result words with bits having the reference value, in this case the value 0. Also, a replacement of the homologous bits of the other final result word with bits having the reference value is carried out.

Obviously, in the presence of equal bits (for example equal to 0) in the two final result words, these final result words are not modified since they then already form the two address words.

The memory MM is then addressed (step 111) with the address information INFD and either an indication IdVj, where j has the value 1, 2 or 3, or the indication IdnV is received in return (step 112).

It is noted in this example that the 2p bits (2p=8) of the two final result words enable the definition of 256 combinations of possible values. Ultimately, however, only nine combinations of values, represented here by the nine reference addresses, represent a valid comparison and, out of these nine combinations, four represent a relationship of inferiority between the two operands, four others represent a relationship of superiority, and only one represents a relationship of equality between the two initial operands.

Thus, in this example, there are only 4% of "correct values" in relation to the total content of the memory MM.

Consequently, an attacker attempting to modify a bit in one of the two initial operands, for example, through fault injection would have very strong chances of ending up with an invalid comparison.

Moreover, it has been evident that, during the operation, the value of some bits was irrelevant. Consequently, even if the attacker modifies the value of a non-significant bit of one of the final result words representing a valid comparison, this will not affect the result and the attacker will not therefore be able to deduce anything from it.

Figure 12:
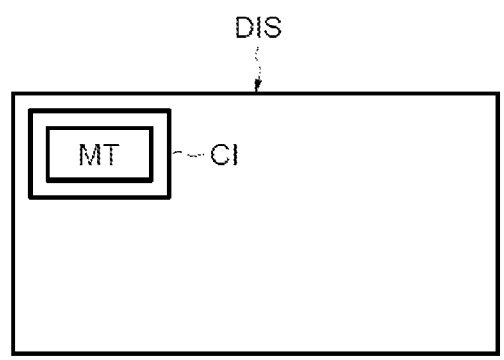

The method which has just been described can be carried out within processing unit MT of an integrated circuit CI of a smartcard DIS (FIG. 12).

This processing unit may include one or more software modules implemented within a microcontroller and/or logic circuits and operators (subtractors, for example) associated with registers.

The different words of the initial operands can be stored in the same order in corresponding positions of the registers.

This being so, in order to make an attack even more difficult, it would be possible to store the different words of the operands in the different positions of the registers in a random manner. However, even in this case, it is appropriate to compare two homologous words of the two operands even if these two homologous words do not occupy homologous positions in the registers.

The management of the behavior of the device in the presence of an indication IdnV (invalid comparison) depends on the applications. Thus, for example, control circuitry may block the operation of the integrated circuit in the presence of an indication of this type.

The invention is not limited to the embodiments which have just been described, but encompasses all variants thereof.

It would thus be totally conceivable to change the operator at each dichotomy step, i.e. for example to use first a difference operator, then a division operator, then a difference operator again, etc.

What is claimed is:

1. A method of secure comparison, the method comprising:
    performing a first comparison operation of a first initial operand with a second initial operand using at least one comparison operator in such a way as to obtain a first final result word having p bits, wherein the first and second initial operands each have b bits and where p is less than b;
    performing a second comparison operation of the second initial operand with the first initial operand using the at least one comparison operator in such a way as to obtain a second final result word having p bits; and
    checking the values of the bits of the first and second final result words in relation to a part of r combinations of reference values taken from $2^{2p}$ possible combinations of values of the first and second final result words, r being less than $2^{2p}$, wherein the reference combination represent a valid result of comparison of the first and second initial operands including an equality, a relationship of inferiority and a relationship of superiority between the first and second initial operands; and
    addressing memory of a storage device using address information generated from the first and second final result words; and
    controlling operation of an integrated circuit according to contents of the memory at a location indicated by the address information.

2. The method according to claim 1, wherein the method is performed in an integrated circuit of an integrated circuit card.

3. The method according to claim 1, wherein the r combinations of reference values include sub-combinations of reference values involving at least some of the 2p bits of the first and second final words, and wherein checking the values comprises performing a check on the presence or absence of one of these sub-combinations of reference values in the values of the bits of the first and second final result words.

4. The method according to claim 3, further comprising generating reference addresses of a storage device from sub-combinations of reference values, each reference address comprising:
    when a sub-combination of reference values involves only q bits, q being less than 2p, the q bits of the sub-combination of reference values supplemented by 2p-q reference bits each having the same reference value; and
    when the sub-combination of reference values involves only 2p bits, the sub-combination of reference values.

5. The method according to claim 4, further comprising storing an indication in a memory device at each of the reference addresses, the indication representing the validity of the comparison and the result of the comparison.

6. The method according to claim 5, wherein checking the values comprises performing a transformation of the first and second final result words into the address information, the address information being:
    the sub-combination of reference values supplemented by 2p-q other bits having the reference value when the final result words contain a sub-combination of reference values involving only q bits; and
    the sub-combination of reference values when the 2p bits of the final result words form this sub-combination of reference values.

7. The method according to claim 6, further comprising outputting an indication representing an invalidity of the comparison when the address information does not correspond to a reference address of the reference addresses.

8. The method according to claim 6, wherein the at least one comparison operator operates on pairs of homologous words of their two corresponding operands and encodes the result of the first comparison of a pair of words on one bit forming one bit of one of the two corresponding result words and encodes the result of the second comparison of the pair of words on one bit forming one bit of the other of the two corresponding result words; and
    wherein a reference address of the reference addresses includes two reference address words;
    wherein
        the bits of the two reference address words are all equal, or
        one of the reference address words contains only one single significant bit equal to one followed by bits all having the reference value, while the other reference address word contains only one single significant bit equal to zero followed by bits all having the reference value, or
        one of the reference address words contains only one single significant bit equal to one preceded by bits all having the reference value, while the other reference address word contains only one single significant bit equal to zero preceded by bits all having the reference value,
        one of the reference address words contains only one single significant bit equal to one, preceded by one or more significant bits equal to zero and followed by bits all having the reference value, while the other reference address word contains significant bits equal to zero, followed by bits all having the reference value; and
    wherein the significant bits are bits of the same order in the two reference address words.

9. The method according to claim 8, wherein the transformation of the first and second final result words into the address information includes a detection in each of the final result words of the presence or absence of a bit equal to one, and at least in the presence of a bit equal to one in only one of the final result words, a replacement in this final result word of the bits following the bit equal to one with bits having the reference value and a replacement of homologous bits of the other final result word with bits having the reference value, in such a way as to form two address words, and in the presence of equal bits in the first and second final result words, a non-modification of the final result words, the latter then forming two address words.

10. The method according to claim 9, wherein the transformation of the first and second final result words into the address information includes detecting in each of the final result words the presence or absence of a bit equal to one, and in the presence of a bit equal to one in each of the final result words, replacing the bits following the bit equal to one in each final result word with bits having the reference value.

11. The method according to claim 1, wherein the first and second comparison operations each use a sequence of a plurality of comparison operators, a current comparison operator of the sequence operating on two current operands in such a way as to obtain two current result words of reduced size compared with the size of the current operands, a first comparison operator of the sequence operating on the first and second initial operands, a last comparison operator of the sequence supplying the first and second final result words, wherein the two current operands are the preceding result words.

12. The method according to claim 1, wherein the at least one comparison operator operates on pairs of homologous words of their two corresponding operands and encodes the result of the first comparison of a pair of words on one bit forming one bit of one of the two corresponding result words and encodes the result of the second comparison of the pair of words on one bit forming one bit of the other of the two corresponding result words.

13. The method according to claim 12, wherein each comparison operator includes a difference operator and wherein each comparison operator is a carry value of a difference between a pair of words.

14. The method according to claim 1, wherein each comparison operator includes a difference operator.

15. A device comprising:
a processing unit coupled to a memory, wherein the processing unit is programmed to perform secure comparison of first and second initial operands each having b bits by:
performing a first comparison operation of the first initial operand with the second initial operand using at least one comparison operator in such a way as to obtain a first final result word having p bits, wherein the first and second initial operands each have b bits and where p is less than b;
performing a second comparison operation of the second initial operand with the first initial operand using the at least one comparison operator in such a way as to obtain a second final result word having p bits; and
checking values of the bits of the first and second final result words in relation to a part of r combinations of reference values taken from $2^{2p}$ possible combinations of values of the first and second final result words, r being less than $2^{2p}$, wherein the reference combination represent a valid result of comparison of the first and second initial operands including an equality, a relationship of inferiority and a relationship of superiority between the first and second initial operands; and
control circuitry connected to the processing unit and configured to control operation of an integrated circuit according to contents of memory of a memory device at a location indicated by address information generated from the first and second final result words.

16. The device according to claim 15, wherein the r combinations of reference values include sub-combinations of reference values involving at least some of the 2p bits of the first and second final result words, and wherein checking the values comprises performing a check on the presence or absence of one of these sub-combinations of reference values in the values of the bits of the first and second final result words.

17. The device according to claim 16, wherein the processing unit is further programmed to generate reference addresses of a storage device from sub-combinations of reference values, each reference address comprising:
when a sub-combination of reference values involves only q bits, q being less than 2p, the q bits of the sub-combination of reference values supplemented by 2p-q reference bits each having the same reference value; and
when the sub-combination of reference values involves only 2p bits, the sub-combination of reference values.

18. The device according to claim 17, further comprising the memory device, wherein the processing unit is further programmed to store an indication in the memory device at each of the reference addresses, the indication representing the validity of the comparison and the result of the comparison.

19. The device according to claim 18, wherein checking the values comprises performing a transformation of the first and second final result words into address information, the address information being:
the sub-combination of reference values supplemented by 2p-q other bits having the reference value when the final result words contain a sub-combination of reference values involving only q bits; and
the sub-combination of reference values when the 2p bits of the final result words form this sub-combination of reference values.

20. The device according to claim 19, wherein the processing unit is further programmed to output an indication representing an invalidity of the comparison when the address information does not correspond to a reference address.

21. The device according to claim 15, wherein the device is a smartcard.

22. A device comprising:
a first logic circuit configured to perform a first comparison operation of a first initial operand with a second initial operand using at least one comparison operator in such a way as to obtain a first final result word having p bits, wherein the first and second initial operands each have b bits and where p is less than b;
a second logic circuit configured to perform a second comparison operation of the second initial operand with the first initial operand using the at least one comparison operator in such a way as to obtain a second final result word having p bits;
a comparator configured to check the values of the bits of the first and second final result words in relation to a part of r combinations of reference values taken from $2^{2p}$ possible combinations of values of the first and second final result words, r being less than $2^{2p}$, wherein the reference combination represent a valid result of comparison of the first and second initial operands including an equality, a relationship of inferiority and a relationship of superiority between the first and second initial operands; and
control circuitry configured to control operation of an integrated circuit according to contents of memory of a memory device at a location indicated by address information generated from the first and second final result words.

23. The device according to claim 22, wherein the r combinations of reference values include sub-combinations of reference values involving at least some of the 2p bits of the first and second final words, and wherein checking the values comprises performing a check on the presence or absence of one of these sub-combinations of reference values in the values of the bits of the first and second final result words.

24. The device according to claim 23, further comprising the memory device, wherein the memory device is configured to store an indication at each of a plurality of references addresses, the indication representing the validity of the comparison and the result of the comparison.

25. The device according to claim 24, wherein each reference address comprises:
when a sub-combination of reference values involves only q bits, q being less than 2p, the q bits of the sub-combination of reference values supplemented by 2p-q reference bits each having the same reference value; and
when the sub-combination of reference values involves only 2p bits, the sub-combination of reference values.

26. The device according to claim 22, wherein the device is a smartcard.

* * * * *